UNITED STATES PATENT OFFICE.

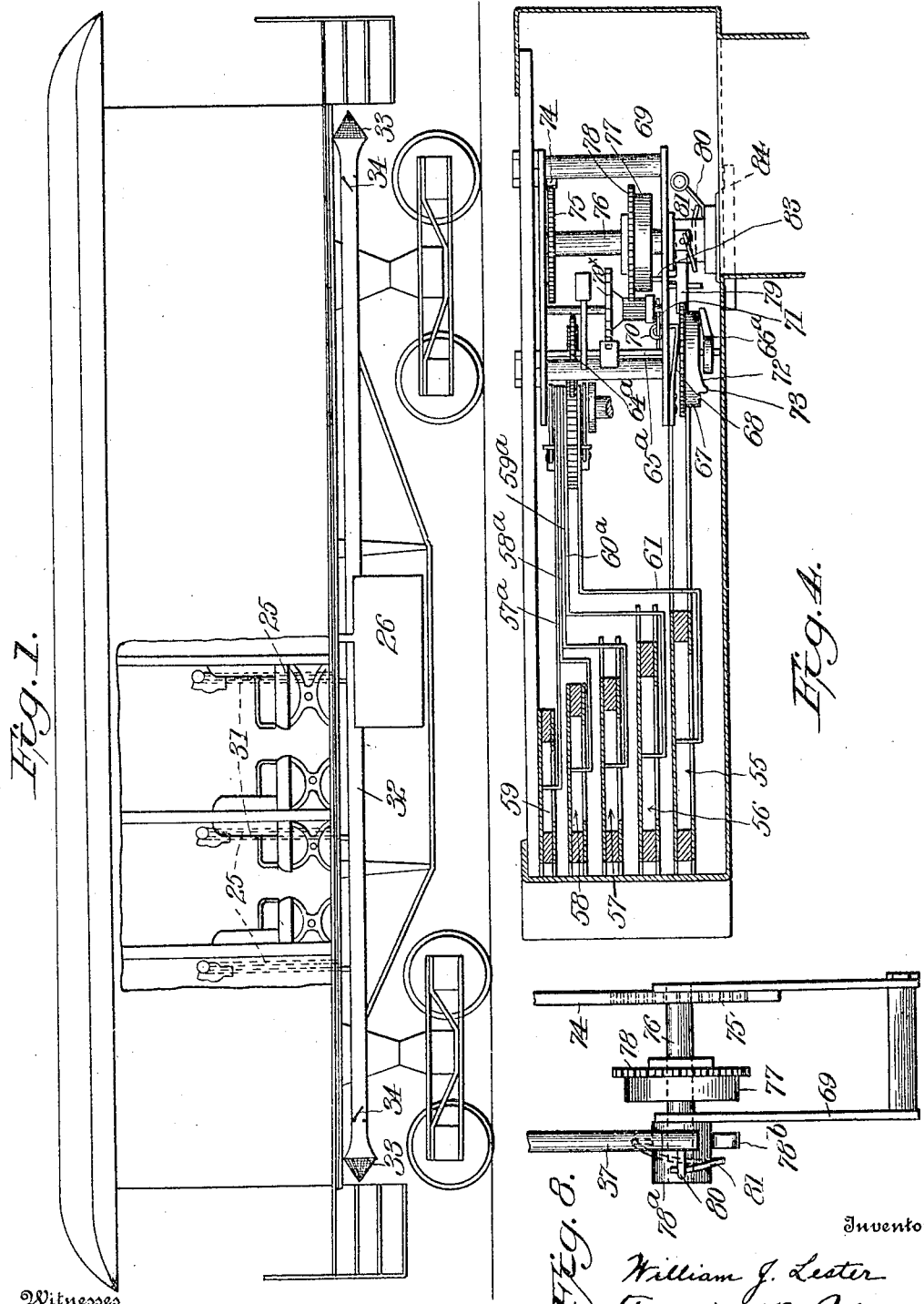

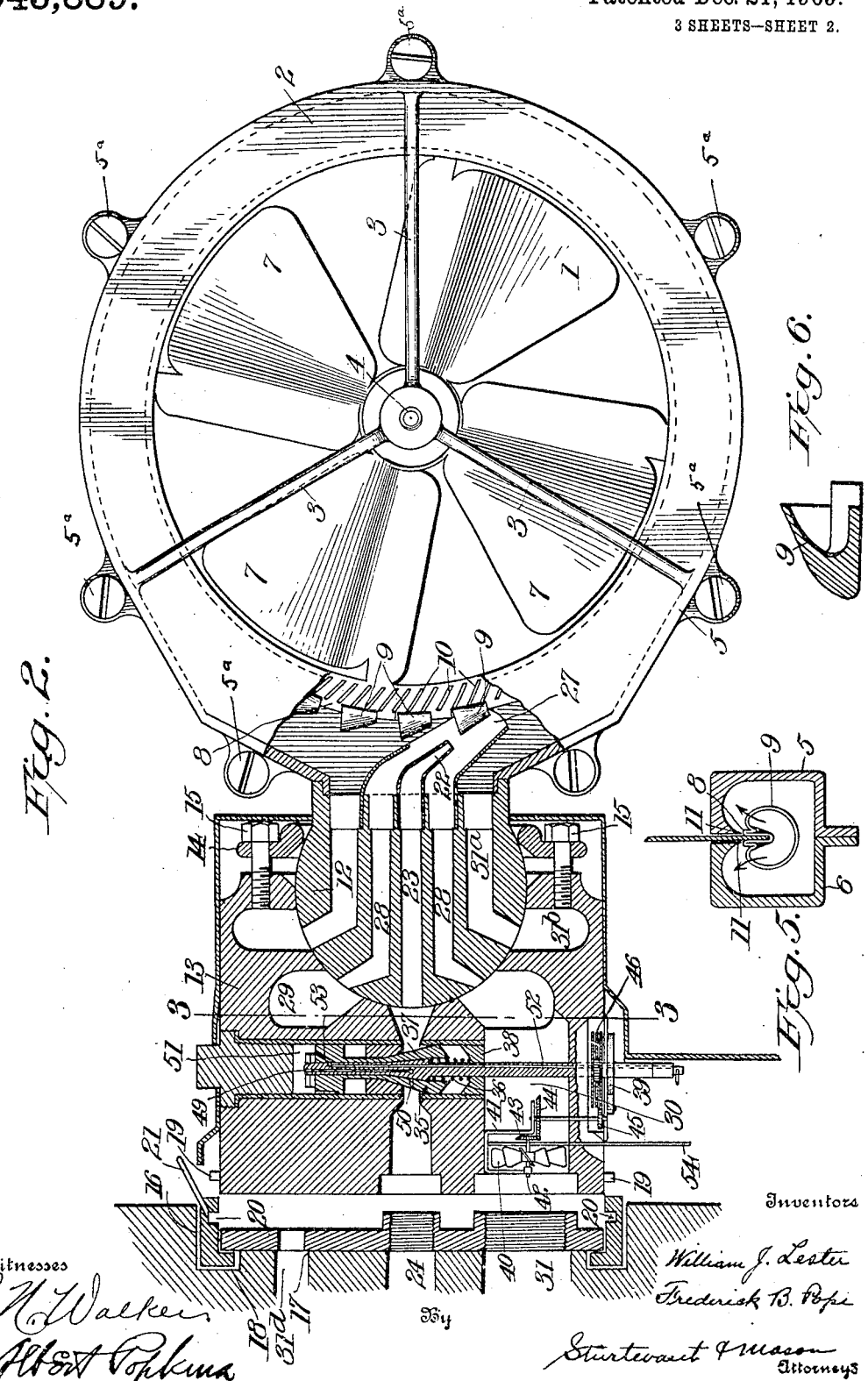

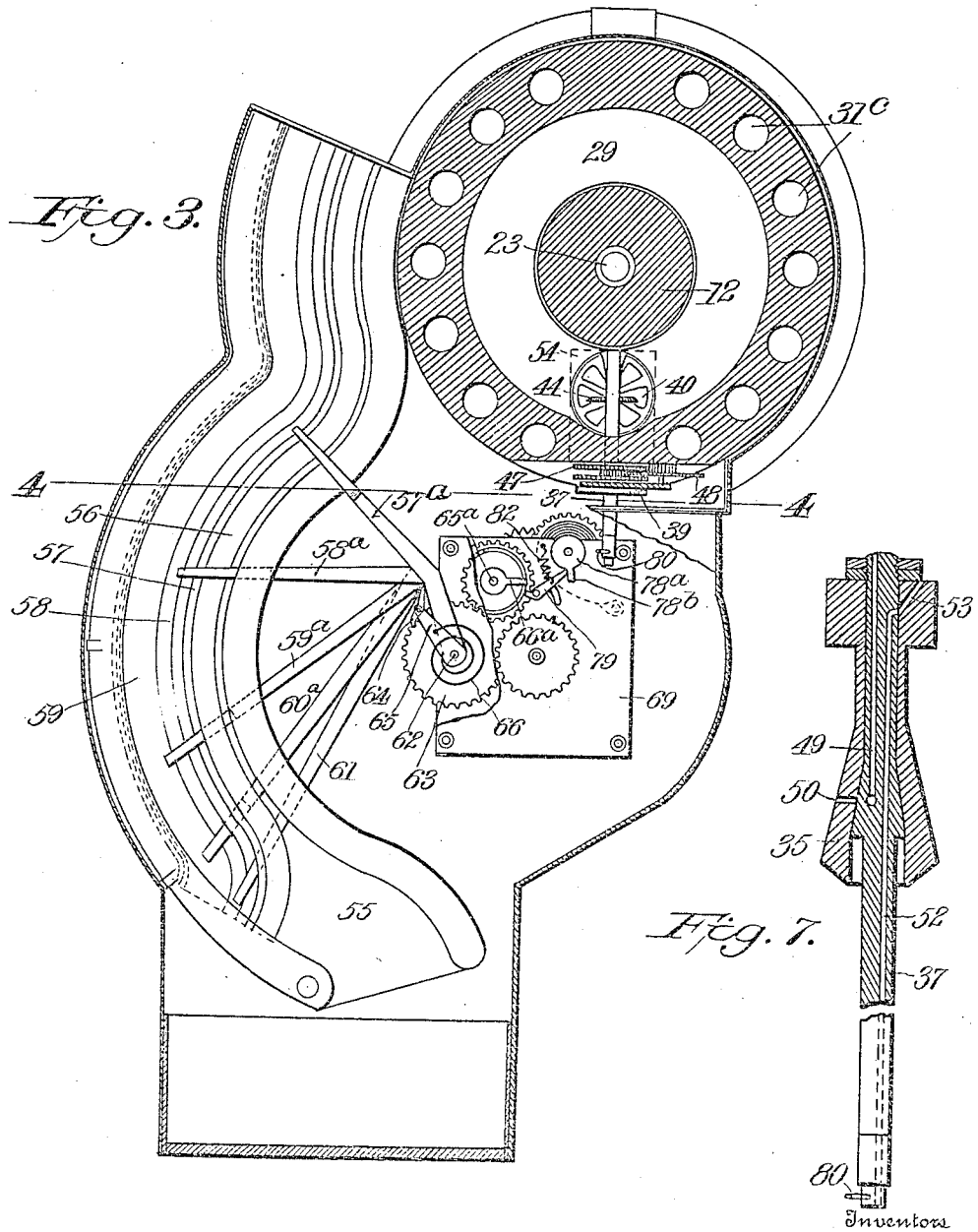

FREDERICK B. POPE, OF AUGUSTA, GEORGIA, AND WILLIAM J. LESTER, OF BOSTON, MASSACHUSETTS.

VENTILATING DEVICE FOR VEHICLES.

943,889.     Specification of Letters Patent.     Patented Dec. 21, 1909.

Application filed March 30, 1908. Serial No. 424,127.

*To all whom it may concern:*

Be it known that we, FREDERICK B. POPE and WILLIAM J. LESTER, citizens of the United States, residing at Augusta, Richmond county, Georgia, and Boston, in the county of Suffolk, State of Massachusetts, respectively, have invented certain new and useful Improvements in Ventilating Devices for Vehicles, of which the following is a description, reference being had to the accompanying drawing, and to the letters and figures of reference marked thereon.

Our invention relates to ventilating devices, more especially adapted for moving vehicles, although from certain aspects, it will be obvious that said invention may be applied to various uses.

An object of our invention is to provide a fan or the like for moving the air of a vehicle which is operated from a motor driven by stored power, when said vehicle is at rest, and which is driven by power generated by the movement of the vehicle when in motion.

A further object of our invention is to provide a device of the above character, with automatic means which will cause the stored power to operate when the vehicle is at rest and the generated power to operate when the vehicle is in motion.

A further object of our invention is to provide a device of the above character with coin-controlled mechanism, whereby the said motor may be caused to operate for a given period.

Still further objects of our invention will in part be obvious, and will in part be hereinafter more fully described.

Our invention consists in the parts, improvements and arrangements hereinafter shown and described and set forth in the appended claims.

In the drawings, which show by way of illustration one embodiment of our invention, Figure 1 is a side elevation showing a vehicle with our invention applied thereto; Fig. 2 is an enlarged detail with certain parts in section, showing the fan, the motor and the support therefor, together with the valve mechanism for controlling the operating fluid; Fig. 3 is a sectional view on the line 3—3 of Fig. 2, also showing the coin-controlled mechanism beneath the support for the fan and motor; Fig. 4 is a sectional view on the line 4—4, of Fig. 3; Fig. 5 is a sectional view through the outer casing for the motor and fan; Fig. 6 is an enlarged sectional view of one of the buckets; Fig. 7 is an enlarged detail view of the valve for the pipe, leading to the compressed air tank; and Fig. 8 is a detail, showing the connection between the valves and the coin-controlled mechanism.

In the present application of our invention, we have shown a railroad car equipped with our ventilating system. A fan is suitably supported by a bracket fixed to the side of the car, preferably adjacent the upper portion of the seat, so that when the sleeping compartments are formed each compartment will be provided with a fan. This fan is driven by an air motor, which is connected by suitable pipes to the auxiliary air brake cylinder, so that when desired said motor may be operated from the compressed air in said cylinder. The motor is also connected with the outside air, so that when the car is in motion, said outer air may be used to operate said motor. We have also provided a valve mechanism, whereby the compressed air may be shut off from the motor, and the motor operated entirely from the outer air; while on the other hand, when the speed of the car is slackened, so that the atmospheric pressure is not sufficient to operate the motor, said motor may be then opened to the compressed air and operated thereby. We have also provided coin-controlled mechanism whereby the motor may be closed to all air from the outside and also the compressed air in the brake cylinder, and at the same time, by means of a coin opened up so that said motor may be operated for a given period, depending upon the value of the coin.

In carrying out our invention, we have provided a fan 1, which is mounted within a casing 2. Said casing is provided with inwardly extending supports 3, which carry a bearing 4 for the fan 1. We have preferably provided the bearing 4 with balls, whereby the fan 1 may be operated with as little friction as possible. Said ball bearing structure is the ordinary form, and will not need further description in this connection.

The casing 2 is made in two sections 5 and 6, which are secured together by suitable screws 5ª. The fan 1 is struck up from a disk of sheet metal forming the blades 7, 7, and a rim 8, (see Figs. 2 and 5). Said rim 8 extends within the outer casing 2, and is provided with a series of buckets 9, which are secured thereto in any suitable way. The rim 8 is also provided with a series of grooves 10, which are slightly inclined to the radius of the fan. The casing 2 for the fan is provided with inwardly extending portions 11. The purpose of said inwardly projecting portions 11 is to prevent leakage of the operating fluid for the fan.

Each of the buckets 9 is so shaped, that the operating fluid which strikes against the inner surface thereof is deflected inwardly toward the axis of said fan, but slightly laterally thereof, as shown by the arrows in Fig. 5. The purpose of constructing the bucket in this manner, is to further avoid any leakage of the operating fluid through the space in the casing in which the supporting disk for the buckets operates. The inclined grooves 10 will also operate to create a force to prevent any leakage of the operating fluid through the said space. This force is caused by the friction of the sides of the groove against the fluid. As the grooves are inclined the force is outward from the axis of the fan. It will, therefore, be seen that we have provided a combined motor and fan in which the buckets of the motor are carried directly by the fan, and so housed within an outer casing as to prevent the operating fluid from coming in contact with the fan blades.

The casing 4 for supporting the fan and motor is provided with a supporting arm 12, which is in the form of a ball joint. Said arm fits a corresponding socket in the supporting base 13, and is held therein by a clamping ring 14 and clamping screws 15. It will thus be seen that said fan may be given a limited movement in any direction relative to its supporting base. Said supporting base is secured to the side of the vehicle or in any other suitable place by the following means: The wall of the vehicle is preferably recessed, and a locking collar 16 is set into said recess and held therein by a locking plate 17, which engages over ears 18 formed on said locking collar 16. The supporting base 13 is provided with pins 19, which register with spiral slots 20, formed in the locking collar 16. The pins of said supporting base are placed within said spiral slots and the collar turned by means of the handle 21, and it will thus be seen that the supporting base will be drawn against the locking plate 17 and firmly secured in position against the wall of the vehicle.

As a means for operating the motor, we have provided a nozzle 22, which is carried by the supporting arm 12, for the casing of the motor, and said nozzle is bent laterally and so positioned as to direct a fine stream of fluid, such as air, against the buckets of the motor. The nozzle 22 forms a continuation of the passage 23, which connects with the pipe 24 leading through pipes 25 to the auxiliary air brake cylinder 26. We have also provided a much larger nozzle 27, which is likewise secured to the supporting arm 12, and said nozzle 27 surrounds the nozzle 22 above referred to. Passages 28 lead through the supporting arm to a passage 29 in the supporting base, which passage leads into a passage 30 connected with a pipe 31.

The pipe 31 is connected with a collecting pipe 32, mounted on suitable brackets outside of the vehicle, and extending substantially the entire length thereof. The said collecting pipe 32 is provided at each end with a tapered gauze sieve 33. Said collecting pipe is also provided near each end with a pivoted flap valve 34, opening inward so that whichever way the car may be traveling, the forward end only of the collecting pipe will be open to the outside air. As the air rushes in said collecting pipe, it will close the valve at the rear end thereof and passing up through the pipe 31, will be led through the nozzle 27 to the buckets of the air motor.

The impelling air, whether thrown against the buckets by the nozzle 22, or the nozzle 27, circulates around the motor in the outer casing and passes out through a passage 31ª in the supporting arm for the casing, which communicates with a passage 31ᵇ in the supporting base, which is connected to the passages 31ᶜ leading to the passage 31ᵈ, connected with the outer air. It will thus be seen that the air which drives the motor is led to the outside of the vehicle.

As a means for controlling the compressed air of the auxiliary air brake cylinder, we have provided a valve 35, which is preferably cone-shaped and normally pressed up by means of a spring 36, so as to engage its seat and prevent the air from passing through the pipe 24 into the pipe 23. Centrally of said valve 35 is a valve stem or support 37, which extends down through a bearing 38, and through the lower side of the supporting base 13. A spiral spring 39 secured at one end to the stem 37 and at its other end to the supporting base tends to rotate the valve stem in one direction.

A flutter wheel 40 is located in the passage 30, through which the air from the collecting tube or pipe 32 passes. Said flutter wheel is supported in a suitable bracket 41, by a shaft 42, which carries a small gear 43, meshing with a gear 44 on a vertical shaft which carries a gear 45 at its lower end connected by suitable multiplying gear 46 with the stem 37 of said valve. As shown in Fig. 3, the upper gear wheel 47 is integral with the valve stem, while the lower gear is loose thereon and acts through the gear 48 to operate the gear 47. Said lower gear is in mesh with the gear 45. Said flutter wheel, through the gearing above referred to, operates to turn the valve stem in the opposite direction from the movement caused by the spiral spring 49.

The valve stem is provided with a passage 49 which extends longitudinally thereof to a point opposite the passage 50 in the outer cone of said valve. Said passage 49 has a short passage at right angles thereto, leading to the outer face of said valve stem 37, so that when said valve stem is properly positioned, said passage 49 and the passage 50 are in register, and the compressed air in the pipe 24 will pass through said passages to the space 51 at the end of the valve 35. Said compressed air will then force the valve longitudinally against the action of the spring 36 and cause the valve to be opened, which will allow the passage of the compressed air through the pipe 24 to the pipe 23. The valve stem 37 is also provided with a passage 52, extending longitudinally thereof from the bottom of the valve stem to a point near its upper end. Said passage is so located as at times to be brought into register with a passage 53, leading through the upper end of the outer portion of the valve to the space 51 at the end thereof.

When the valve stem is rotated so as to bring the passages 49 and 50 out of register, the passage 52 and passage 53 are brought into register so that the space 51 at the end of the valve is opened up to the outer atmosphere. This relieves the pressure on the end of the valve in the space 51 and allows the spring 36 to force the valve longitudinally, and close the passage between the pipe 24 and the pipe 23.

The spiral spring 39 normally rotates the valve stem so that the passages 49 and 50 are in register, and the valve thereby opened by the compressed air passing to the end of the valve. When, however, the motion of the vehicle exceeds a certain speed, say, for example, 15 miles an hour, so that sufficient atmospheric pressure is created to operate the fan from the outer air, the flutter wheel 40 will be caused to rotate and operate through the gearing connected therewith to rotate the valve stem, so as to bring the passages 49 and 50 out of register, and the passages 52 and 53 into register, which will allow the spring 36 to close the valve and thus shut off the compressed air.

As soon as the speed of the vehicle decreases, so that the atmospheric pressure is not sufficient to operate the fan, the flutter wheel will be operated in the reverse direction by the spring 39, and the valve seat rotated, so as to open up the valve and allow the fan to be operated by the compressed air.

We have provided a sliding valve 54, which may be raised so as to close the passage 31 and thus close the motor to the outer air, and thus prevent the operation of the fan, even though the vehicle be moving.

As a means for controlling the operation of the fan, so that the same may be operated for a definite period, and then automatically stopped, we have provided the following coin-controlled mechanism. Said coin-controlled mechanism consists of a plurality of slots 55, 56, 57, 58, and 59, to receive coins of various denominations. A lever 57$^a$ coöperates with the coin slot 59, and similar levers 58$^a$, 59$^a$, 60$^a$ and 61 coöperate with the other slots. Said levers are mounted upon a shaft 62, so as to turn freely thereon. When a coin is dropped in the proper slot, the lever is carried around by said coin until the coin passes by the end of the lever at the bottom end of the slot, and then the lever is released and returned to its normal raised position. A ratchet wheel 63 is mounted upon said shaft 62. A pawl 64 is carried by a swinging arm 65, which is normally held in its raised position by means of a spiral spring 66. When the lever 57$^a$ for example, is carried forward by means of the coin, said lever engages the arm 65, carrying the pawl 64, and moves said arm forward, thus moving the ratchet wheel 63 a distance corresponding to the movement of the lever 57$^a$. It will thus be seen that the ratchet wheel 63 will be moved a distance corresponding to the movement of the lever which operates the same, and thereby a distance corresponding to the denomination of the coin which is inserted in the device. Said ratchet wheel 63 is geared to a ratchet wheel 64$^a$, rigidly carried by a shaft 65$^a$ which carries an arm 66$^a$ at its forward end. A stop wheel 67 is loosely mounted on the shaft 65, so as to slide longitudinally thereof. Said stop wheel 67 is suitably geared to an operating wheel carried by a clock mechanism, so that as said clock mechanism operates, said stop wheel will be rotated thereby. A spring 68 is secured to the frame of the timepiece 69, and normally presses said stop wheel 67 outwardly. Said spring is provided with an inwardly bent end, carrying a hook 70, which engages a pin 71, carried by the escapement of the valve operating mechanism.

The stop wheel 67 is provided with a cam shoulder 72 and a stop lug 73, so that as said stop wheel is rotated, the cam shoulder will contact with the arm 66$^a$, thus crowding the stop wheel longitudinally of its supporting shaft until the arm 66$^a$ contacts with the stop lug 73, after which the stop wheel will be held in this position. The rotating shaft 65ᵃ in the timing mechanism is frictionally connected with its bearings in the usual manner of alarm clocks, so that said shaft 65ᵃ can rotate when arm 66ᵃ is against stop lug 73, but will be held by friction from rotating at any other time.

The sliding valve 54 is provided with a depending stem 74, which carries a rack at its lower end meshing with a gear 75 on a shaft 76, which is operated by a main spring 77. Said shaft 76 also carries a gear wheel 78, which meshes with an escapement 79ˣ of the usual character. The valve stem 37 carries an outwardly extending arm 80 at its lower end. Said arm 80 engages a spiral cam 81, carried by the shaft 76. Said shaft 76 also carries a blank gear 78ᵃ, having an upwardly extending arm or lug 78ᵇ. A lever 79 is pivoted to the frame 69, and is provided with a forked end which straddles the stop wheel 67, so that said stop wheel may rotate freely in said forked end, but all lateral movements of the stop wheel are conveyed to said lever 79. Said lever 79 slides freely on its supporting shaft. A spring 82 moves said lever 79 about its pivot, and a finger 83, carried by said lever and engaging a slot in the frame 69, limits the movement of said lever. Said lever 79 is so located that the lug 78ᵇ on the blank gear 78ᵃ will contact therewith and hold the shaft, and thus prevent the winding of the main spring mechanism which controls the valve gear.

The operation of our device is as follows: A coin is dropped in the proper slot which will engage one of the levers, thus moving the ratchet wheel 63 a predetermined distance, which in turn will move the arm 66ᵃ a predetermined distance away from the stop 73 on the stop wheel. As the arm 66ᵃ is moved away from the stop 73, down the cam surface 72, the spring 68 will move said stop wheel laterally, which will in turn move the lever 79 longitudinally of its supporting pin, bringing the forward end thereof out of the path of the lug 78ᵇ on the blank gear wheel 78ᵃ. At the same time, the hook portion 70 of the spring 68 will engage the pin 71, of the escapement and lock the same against movement. The operator may now grasp the thumb piece 84 and rotate the shaft 76. As said shaft 76 is rotated, the main spring for the valve-operating mechanism will be wound up and at the same time the valve 54 will be drawn down by reason of the fact that the pinion 75 engages a rack on the lower end of the said valve 54. At the same time, the spiral cam 81 carried by the shaft 76 will move out of the path of the arm 80, so that the spiral spring 39 may rotate the valve stem 37, bringing the passages 49 and 50 into register, which will thus cause the valve to be opened, allowing the compressed air to enter and operate the fan. If at the time the coin is dropped in the slot, the vehicle is under proper speed, so as to create sufficient atmospheric pressure to operate the motor, the flutter wheel 40 will at once be set into motion, which would close the valve to the compressed air chamber, and allow the motor to be operated by the outside air. It will thus be seen that the motor will continue to operate, either by stored power, or by the generated power, for a given period of time. As soon as the clock mechanism rotates the stop wheel 67, so that the cam shoulder 72 is brought into contact with the arm 66, said stop wheel will be forced longitudinally on its supporting shaft, moving the spring 68 inward until the hook 70 releases the escapement, and at the same time, the lever 79 will be brought into the path of the lug 78ᵇ. As soon as the escapement is released, the main spring 77 will rotate the shaft 76, and the gear wheel 75, until the lug 78ᵇ is brought around by the lever 79 and the valve 54 has been moved up across the passage 31, to close the same. At the same time, the spiral gear 81 will swing the arm 80 around, so as to close the valve controlling the compressed air. The lever 79 swings on its pivot, allowing the lug 78ᵇ to pass the same. This will close the valves so that the fan is stopped, and at the same time the lever 79 is brought into position to prevent further winding or operating of said valves until another coin is dropped in the slot.

While we have shown a fan located in each compartment, and a motor adjacent thereto for operating the same, it is obvious that from certain aspects of our invention, the motor might be otherwise located and connected to the fan or fans in any suitable way. It will also be obvious that from certain aspects of our invention, the fan construction and motor for operating the same herein disclosed, may be used for various purposes and may be operated by other means than by air. It will also be obvious from certain aspects of our invention, that other stored power than compressed air may be used to operate the fan when the vehicle is at rest.

Having thus described our invention, what we claim as new and desire to secure by Letters Patent, is:—

1. Ventilating devices for vehicles, including in combination, a fan, a motor for operating said fan, means for operating said motor from stored power, means for operating said motor by power generated by the movement of the vehicle, and automatic mechanism for shifting from one power to the other when said vehicle is at rest or moving at a slow speed.

2. Ventilating devices for vehicles, including in combination, a fan, a motor for operating the same, means for operating said motor by atmospheric pressure when the vehicle is moving above a certain speed, and automatic means for operating said motor from compressed air when said vehicle is at rest or moving at a slow speed.

3. Ventilating devices for vehicles, including in combination, a fan, a motor for operating the same, means for operating said motor by atmospheric pressure when the vehicle is moving above a certain speed, automatic means for operating said motor from compressed air when said vehicle is at rest or moving at a slow speed, and mechanism for controlling said operating means.

4. Ventilating devices for vehicles, including in combination, a fan, a motor for operating said fan, a compressed air tank, a pipe leading therefrom to said motor, a collecting pipe, and pipes leading therefrom to said motor, and automatic mechanism whereby said motor is operated from said compressed air when the car is moving at or below a predetermined speed.

5. Ventilating devices for vehicles, including in combination, a fan, a motor for operating said fan, a compressed air tank, a pipe leading therefrom to said motor, a collecting pipe, pipes leading therefrom to said motor, automatic mechanism whereby said motor is operated from said compressed air when the car is moving at or below a predetermined speed, and mechanism whereby said motor may be operated for a given time and automatically stopped.

6. Ventilating devices for vehicles, including in combination, a fan, a motor for operating the same located within said vehicle, an auxiliary compressed air tank, a pipe leading from said tank to said motor, and a pipe leading from said motor to the outside of the vehicle for carrying off the air used for operating said motor.

7. Ventilating devices for vehicles, including in combination, a fan located within said car, a motor within said car for operating said fan, a collecting pipe outside of said car, a pipe leading from said collecting pipe to said motor, a casing surrounding said motor, and a pipe leading from said casing to the outside of the car for carrying off the air used for operating said motor.

8. Ventilating devices for vehicles, including in combination, a fan, a motor for operating the same, an auxiliary compressed air tank, a pipe leading from said tank to said motor, a pipe leading from said motor to the outside of the car for carrying off the air used for operating said motor, and mechanism for controlling the time of operation of said motor.

9. Ventilating devices for vehicles, including in combination, a fan located within said car, a motor within said car for operating said fan, a collecting pipe outside of said car, a pipe leading from said collecting pipe to said motor, a casing surrounding said motor, a pipe leading from said casing to the outside of the car for carrying off the air used for operating said motor, and mechanism for controlling the time of operation of said motor.

10. Ventilating devices for vehicles, including in combination, a fan, a motor for operating the same, an auxiliary compressed air tank, a collecting pipe, a pipe leading from said tank to said motor, a pipe leading from said collecting pipe to said motor, a valve for controlling the flow of air from said tank, a casing surrounding said motor, and pipes leading from said casing to the outside of said vehicle.

11. Ventilating devices for vehicles, including in combination, a fan, a motor for operating the same, a compressed air tank, a collecting pipe, a pipe leading from said tank to said motor, a pipe leading from said collecting pipe to said motor, a valve for closing the pipe leading from the tank, and means operated by the movement of the car for controlling said valve.

12. Ventilating devices for vehicles, including in combination, a fan, a motor for operating the same, a compressed air tank, a collecting pipe, a pipe leading from said tank to said motor, a pipe leading from said collecting pipe to said motor, a valve for closing the pipe leading from the tank, and means operated by the atmospheric pressure caused by the movement of the car for controlling said valve.

13. Ventilating devices for cars, including in combination, a fan, a motor for operating the same, a compressed air tank, a pipe leading from said compressed air tank to said motor, a collecting pipe, a pipe leading from said collecting pipe to said motor, a valve for controlling the pipe leading from the compressed air tank, and means located within the pipe leading to the collecting pipe for controlling said valve.

14. Ventilating devices for cars, including in combination, a fan, a motor for operating the same, a compressed air tank, a pipe leading from said compressed air tank to said motor, a collecting pipe, a pipe leading from said collecting pipe to said motor, a valve for controlling the pipe leading from the compressed air tank, a flutter wheel mounted in said pipe leading to the collecting pipe, and means for connecting said flutter wheel to said valve, whereby said valve is controlled thereby.

15. Ventilating devices for cars, including in combination, a fan, a motor for operating the same, a compressed air tank, a pipe leading from said compressed air tank to said motor, a collecting pipe, a pipe leading from said collecting pipe to said motor, a valve for controlling the pipe leading from the compressed air tank, a flutter wheel mounted in said pipe leading to the collecting pipe, multiplying gearing between said flutter wheel and said valve for turning said valve in one direction, and a spring for turning said valve in the opposite direction.

16. Ventilating devices for cars, including in combination, a fan, a motor, a compressed air tank, a pipe leading from said compressed air tank to said motor, a valve located in said pipe leading from said tank, a spring for normally holding said valve closed, a passage leading from said pipe to the end of said valve, means for opening and closing said passage, whereby the valve may be moved against the action of said spring by the compressed air to open the valve.

17. Ventilating devices for cars, including in combination, a fan, a motor, a compressed air tank, a pipe leading from said compressed air tank to said motor, a valve located in said pipe leading from said tank, a spring for normally holding said valve closed, a passage leading from said pipe to the end of said valve, means for opening and closing said passage, whereby the valve may be moved against the action of said spring by the compressed air to open the valve, a collecting pipe, a pipe leading from said collecting pipe to said motor, and means operated by the pressure of the air in said pipe leading from the collecting pipe for opening and closing the passage from the end of the valve to the pipe leading to the compressed air tank.

18. Ventilating devices for cars, including in combination, a fan, a motor for operating the same, a compressed air tank, a pipe leading from said compressed air tank to said motor, a valve for controlling said pipe, a stem located centrally of said valve and having a passage extending longitudinally thereof, adapted to be brought into register with a passage extending through said valve, so as to connect the pipe leading to the compressed air tank with the space at the end of the valve, said valve stem having a passage adapted to be brought into register with a passage in the valve leading to the space at the end thereof, when the passage in said stem is out of register with the passage leading to the pipe, and a spring for normally holding said valve closed.

19. Ventilating devices for cars, including in combination, a fan, a motor for operating the same, a compressed air tank, a pipe leading from said compressed air tank to said motor, a valve for controlling said pipe, a stem located centrally of said valve and having a passage extending longitudinally thereof, adapted to be brought into register with a passage extending through said valve, so as to connect the pipe leading to the compressed air tank with the space at the end of the valve, said valve stem having a passage adapted to be brought into register with a passage in the valve leading to the space at the end thereof, when the passage in said stem is out of register with the passage leading to the pipe, a spring for normally holding said valve closed, a collecting pipe, a pipe leading from said collecting pipe to said motor, a flutter wheel mounted in said pipe leading to the collecting pipe, multiplying gearing between said flutter wheel and said valve stem for rotating said valve stem so as to bring the passage leading to the end of the valve and connecting with the pipe leading to the compressed air out of register, and a spring for normally rotating said valve stem, so as to bring said last named passages into register.

20. Ventilating devices for cars, including in combination, a supporting base, means for detachably securing the same to said car, a motor casing supported by said base, a motor supported by said casing, a fan operated by said motor, and means for operating said motor.

21. Ventilating devices for cars, including in combination, a supporting base, an arm having universal connection therewith, a motor casing carried by said arm, a combined motor and fan supported by said casing, and means for operating said motor.

22. Ventilating devices for cars, including in combination, a supporting base, lugs carried thereby, a locking collar rotatably secured to the side of said car and having grooves formed therein to receive the lugs on said base, a combined motor and fan, a casing therefor, an arm extending from said casing and connected to said supporting base, and means for operating said motor.

23. Ventilating devices for cars, including in combination, a supporting base, means for detachably securing the same to the side of the car, a disk having fan blades struck up therefrom, buckets secured to the outer edge of said disk, a casing surrounding said buckets, means for directing an operating fluid against said buckets, and means connected with said casing for carrying away the fluid used for operating the fan.

24. Ventilating devices for cars, including in combination, a supporting base, means for detachably securing the same to the side of the car, a disk, having fan blades struck up therefrom, buckets secured to the outer edge of said disk, a casing surrounding said buckets, means for directing an operating fluid against said buckets, means connected with said casing for carrying away the fluid used for operating the fan, and mechanism controlling the operation of said fan.

25. Ventilating devices for cars, including in combination, a combined motor and fan consisting of a metal disk having fan blades struck up therefrom, buckets secured to the outer edge of said disk, a casing surrounding said buckets and carrying means for supporting said fan, a nozzle for directing an operating fluid against said buckets, said casing having its inner edges separated forming a space in which said disk may move, said casing adjacent said space being projected inwardly toward the center of the casing, so as to prevent leakage of the operating fluid through said space.

26. Ventilating devices for cars, including in combination, a combined motor and fan consisting of a metal disk having fan blades struck up therefrom, buckets secured to the outer edge of said disk, a casing surrounding said buckets and carrying means for supporting said fan, a nozzle for directing an operating fluid against said buckets, said casing having its inner edges separated, forming a space in which said disk may move, said casing adjacent said space being projected inwardly toward the center of the casing, so as to prevent leakage of the operating fluid through said space, said disk being provided with grooves located in said space and inclined to the diameter of said disk.

27. Ventilating devices for cars, including in combination, a combined motor and fan consisting of a metal disk having fan blades struck up therefrom, buckets secured to the outer edge of said disk, a casing surrounding said buckets and carrying means for supporting said fan, a nozzle for directing an operating fluid against said buckets, said casing having its inner edges separated, forming a space in which said disk may move, said casing adjacent said space being projected inwardly toward the center of the casing, so as to prevent leakage of the operating fluid through said space, said disk being provided with grooves located in said space and inclined to the diameter of said disk, said buckets being curved so as to deflect the operating fluid inwardly toward the center of the fan and laterally thereof, so as to prevent leakage of said fluid from said casing, and means for conveying the operating fluid from said casing.

28. Ventilating devices for cars, including in combination, a fan, a motor for operating the same, including buckets, a casing surrounding said motor, a nozzle for directing compressed air on to said buckets, a second nozzle surrounding said first named nozzle, a collecting pipe, and means for connecting said second nozzle with said collecting pipe, and a valve for controlling the compressed air.

29. Ventilating devices for cars, including in combination, a fan, a motor for operating the same, including buckets, a casing surrounding said motor, a nozzle for directing compressed air on to said buckets, a second nozzle surrounding said first named nozzle, a collecting pipe, means for connecting said second nozzle with said collecting pipe, a valve for controlling the compressed air, and coin-controlling mechanism for controlling the operation of said fan.

30. Ventilating devices for cars, including in combination, a supporting base, having a ball socket therein, an arm having a ball-shaped end located in said socket, a clamping ring for holding said arm in said socket, a casing secured to said arm, a combined motor and fan supported by said casing, said motor comprising buckets, said casing surrounding said buckets and formed of sections secured together by suitable screws, means for detachably securing said supporting base to the side of the car, a compressed air tank, pipes leading from said tank to said motor, a valve for controlling said pipes, a collecting pipe, pipes leading from said collecting pipe to said motor, a valve for said last named pipes, and mechanism controlling the operation of both of said valves.

31. Ventilating devices for cars, including in combination, a fan, a motor for operating the same, a compressed air tank, pipes leading from said compressed air tank to said motor, a collecting pipe, pipes leading from said collecting pipe to said motor, a valve for controlling the pipes leading to said compressed air tank, a valve for controlling the pipes leading to said collecting pipe, and mechanism for closing and locking said valves in closed position.

32. A combined motor and fan, including in combination, a disk having fan blades struck up therefrom, buckets secured to the outer edge of said disk, a casing surrounding said buckets and having its inner edges separated, forming a space in which said disk may operate, said casing having the parts adjacent said space projecting inwardly to prevent leakage therethrough, arms secured to said casing and extending inwardly to support the bearing for said fan, a nozzle extending into said casing for directing an operating fluid against said buckets, and passages leading to said casing for carrying away the operating fluid.

33. A combined motor and fan, including in combination, a disk having fan blades struck up therefrom, buckets secured to the outer edge of said disk, a casing surrounding said buckets and having its inner edges separated, forming a space in which said disk may operate, said casing having the parts adjacent said space projecting inwardly to prevent leakage therethrough, arms secured to said casing and extending inwardly to
5 support the bearing for said fan, a nozzle extending into said casing for directing an operating fluid against said buckets, passages leading to said casing for carrying away the operating fluid, said buckets being
10 curved so as to direct the operating fluid inwardly and laterally away from the fan in order to prevent the fluid from leaking through the space formed in the casing.

In testimony whereof we affix our signatures, in presence of witnesses.

FREDERICK B. POPE.
W. J. LESTER.

Witnesses:
H. G. YOUNG,
C. G. LANE, Jr.,
C. L. RUSSELL,
N. F. AMBURSEN.